UNITED STATES PATENT OFFICE.

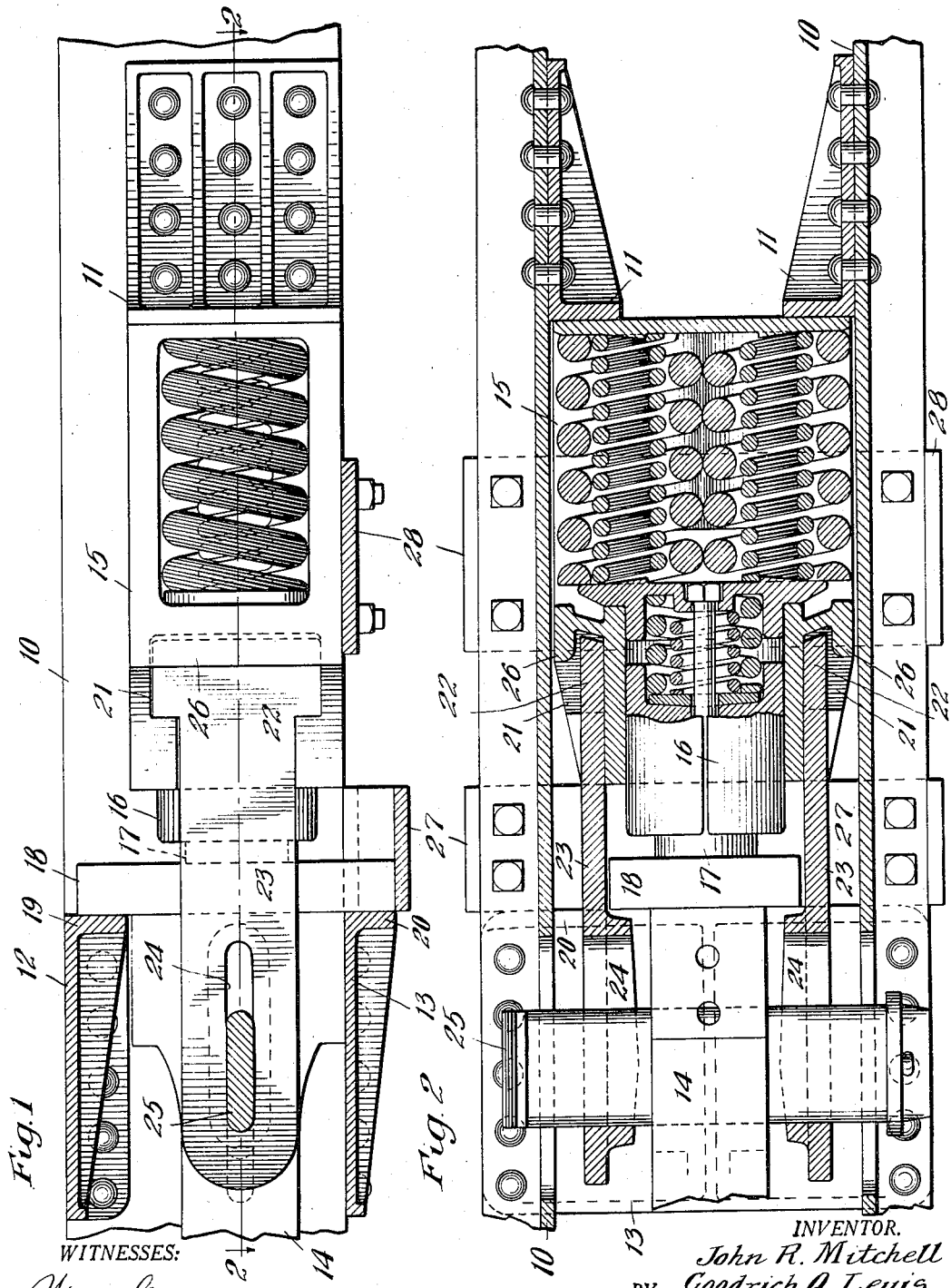

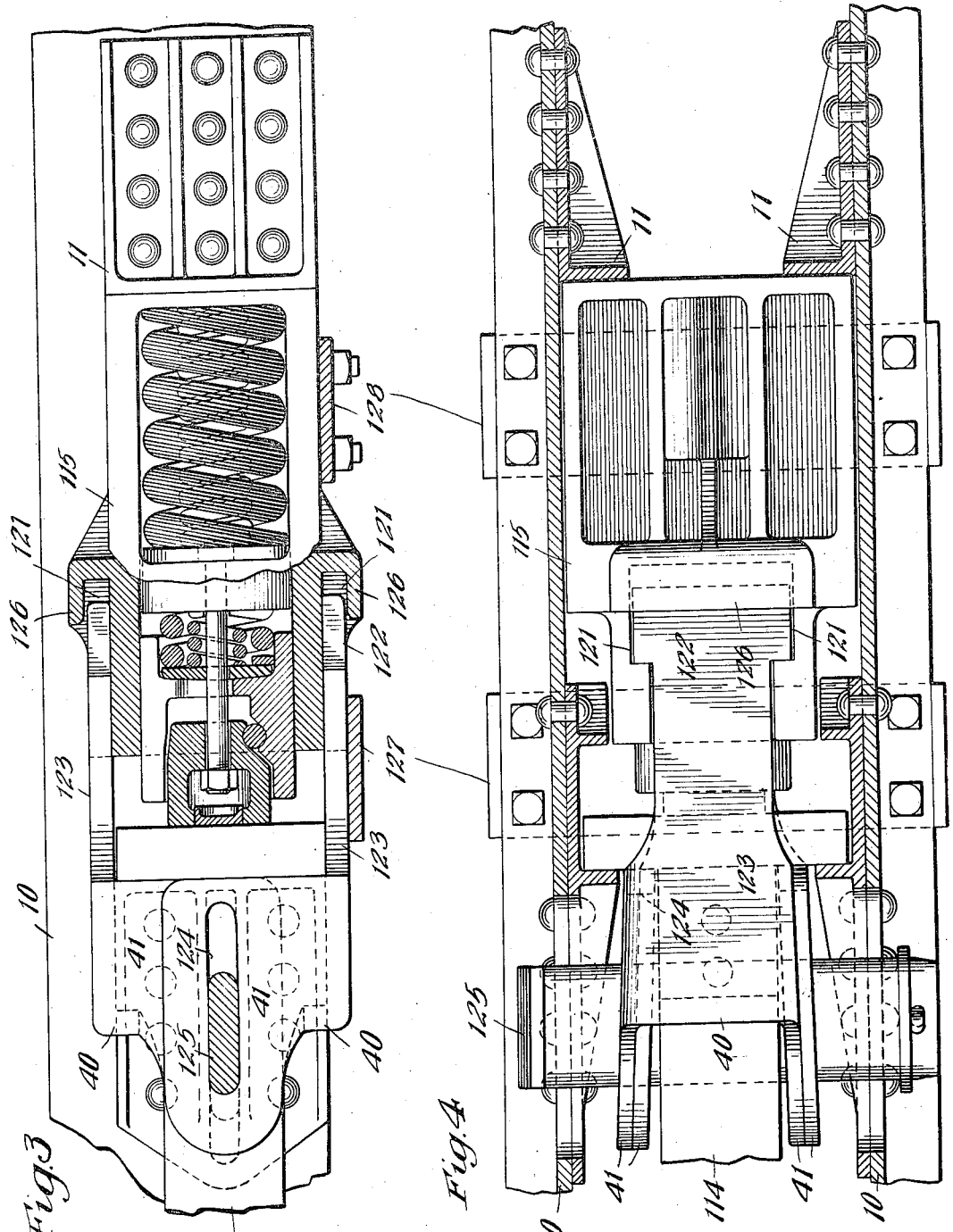

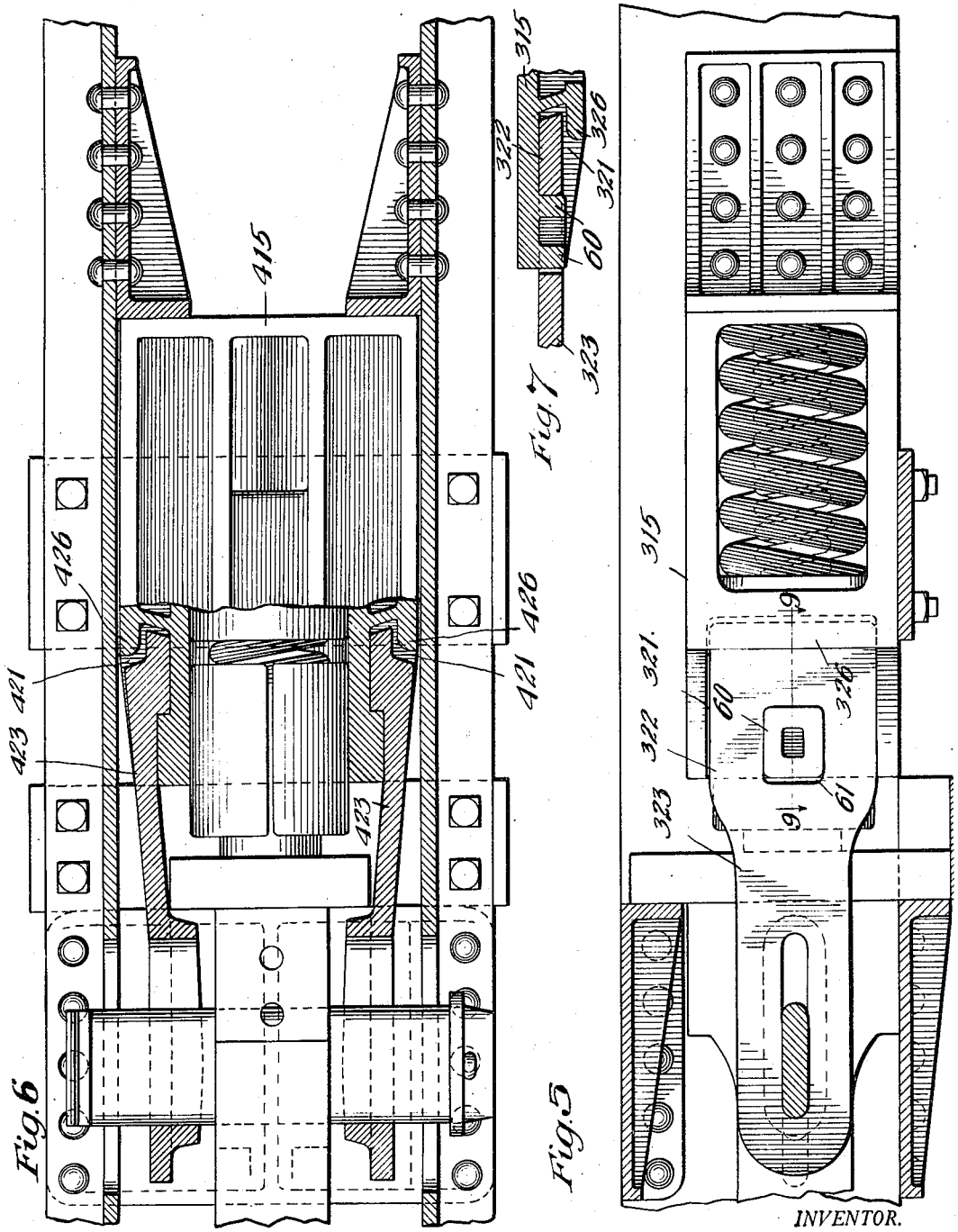

GOODRICH Q. LEWIS, OF WHEATON, AND JOHN R. MITCHELL, OF EVANSTON, ILLINOIS, ASSIGNORS TO WILLIAM H. MINER, OF CHAZY, NEW YORK.

FRICTION DRAFT-GEAR.

1,300,422.  Specification of Letters Patent.  Patented Apr. 15, 1919.

Application filed September 23, 1916. Serial No. 121,716.

*To all whom it may concern:*

Be it known that we, GOODRICH Q. LEWIS, of Wheaton, Dupage county, Illinois, and JOHN R. MITCHELL, of Evanston, Cook county, Illinois, both citizens of the United States, have invented a certain new and useful Improvement in Friction Draft-Gears, of which the following is a full, clear, concise, and exact description, reference being had to the accompanying drawings, forming a part of this specification.

This invention relates to improvements in friction draft gears.

The object of the invention is to provide a friction draft gear having a simple and inexpensive detachable connection between the friction shell and the draw bar, which connection is at the same time so designed as to permit the necessary radial movements of the draw bar.

In the drawing forming a part of this specification, Figure 1 is a longitudinal, vertical section of a draft rigging showing one embodiment of our invention. Fig. 2 is a horizontal, longitudinal section of the structure illustrated in Fig. 1 and taken on the line 2—2 thereof. Figs. 3 and 4 are views corresponding respectively to Figs. 1 and 2, but illustrating a different embodiment of our invention. Figs. 5 and 6 are views corresponding respectively with Figs. 1 and 2 and illustrating a fourth embodiment of our invention. And Fig. 7 is a detail sectional view taken substantially on the line 9—9 of Fig. 5.

Referring first to the structure illustrated in Figs. 1 and 2, 10—10 denote channel center sills, the same having secured thereto stops 11—11, an upper, front horizontal stop 12, and a lower, front horizontal stop 13, the latter being secured to the lower flanges of the sills. 14 denotes the draw bar and 15 a combined friction cylinder and spring cage. Coöperable with the friction cylinder are friction shoes 16 and wedge 17, the latter engaging a front follower 18 which bears against the rear faces 19 and 20 of the front stops 12 and 13, respectively. Within the spring cage are the usual springs and spring follower to resist the movement of the friction shoes, and the rear wall of the spring cage engages against the rear stops 11.

To operatively connect the friction shell with the draw bar, the friction shell is provided on the sides thereof with T-shaped recesses 21—21 within which are adapted to be received T-heads 22 formed on the rear ends of a pair of side links 23—23. Each of said links 23 is provided with an elongated slot 24 at its forward end to receive the coupler key 25 and by which the links are connected to the draw bar. The friction shell is furthermore provided on its sides with forwardly extended flanges 26—26 spaced from the surface of the cylinder proper and thereby forming pockets within which are received said T-heads 22—22. The T-heads of the links are inserted within the pockets thus provided by first holding the links at an angle to the cylinder and then swinging the links to a position parallel with the axes of the cylinder. When in this position, it is apparent that said flanges 26—26 will prevent the T-heads from becoming laterally displaced. The front follower is held in position by means of a tie-plate 27 and the friction cylinder is similarly held by a tie plate 28.

From the preceding description, it will be seen that we have provided a short detachable connection between the friction cylinder and the draw bar and furthermore, the connection is such as to permit the draw bar to have radial movement, the links being adapted to swing within narrow limits relatively to the friction cylinder.

In the construction illustrated in Figs. 3 and 4, the center sills, rear stop and draw bar are substantially the same as the corresponding parts illustrated in Figs. 1 and 2. The friction cylinder 115 is, in general arrangement, similar to the friction cylinder 15, but is provided on the top and bottom thereof, instead of on the side, with T-shaped slots 121 in which are detachably mounted T-heads 122 formed on the rear ends of two yoke members 123—123. Each of the latter is provided at its forward end with a gib 40 to engage one of the shoulders of the draw bar 114, and in addition is provided with a pair of side plates or flanges 41—41, the latter being slotted as indicated at 124 to receive the coupler key 125. The members 123 are counterparts and their side flanges or plates 41 are so formed that they will over-lap, as clearly indicated in Figs. 1 and 2, thus forming a hood or hollow head within which the draw bar butt is received. The friction cylinder 115 is also provided with upper and lower, transversely extending flanges 126 which partly overlap the T-heads 122 and thus form pockets for the latter to prevent the same from being displaced. The parts are held in operative position by tie-plates 127 and 128. It is believed the operation and the manner of assembling and disassembling the parts will be apparent from the preceding description.

In the construction illustrated in Figs. 5, 6 and 7, the arrangement is quite similar to that illustrated in Figs. 1 and 2 except that the specific connection between the rear ends of the links and friction cylinder is changed. In this arrangement, the friction cylinder 315 is provided on each side thereof with a substantially rectangular opening 321 with a centrally located square boss 60 within each of said recesses. Each of the links 323 is provided at its rear end with a rectangular section 322 adapted to fit within the rectangular recess 321, each of said sections 322 having a substantially square central perforation 61 adapting the end of the link to fit over the square boss 60. The friction cylinder is also provided with flanges 326 which overlap the rear ends of the links to prevent the latter from being displaced. The method of assembling the parts, is thought to be apparent from the drawings taken in connection with the preceding description.

Although we have herein shown and described what we now consider the preferred manner of carrying out our invention, the same are merely illustrative and we contemplate all changes and modifications that come within the scope of the claim appended hereto.

We claim:

In a draft rigging, the combination with a friction shell of a friction gear, of a pair of relatively short links for connecting said shell with a draw bar, and integral means on said links and shell for detachably connecting the links with the shell, said means comprising recesses on the shell providing rearwardly facing shoulders, coöperating forwardly facing shoulders at the rear ends of said links, and flanges on the shell located rearwardly of the said shoulders and extended partly over the extreme inner ends of the links when the latter are assembled with the shell to thereby prevent lateral separation of the links from the shell, said links being attached by applying the same first at an angle to the axis of the shell and then bringing them into parallelism with said axis.

In witness that we claim the foregoing we have hereunto subscribed out names this 8th day of September, 1916.

GOODRICH Q. LEWIS.
JOHN R. MITCHELL.

Witnesses:
GOLDIE A. BISHOP,
RAY F. BRUCE.